(12) United States Patent
Lumley et al.

(10) Patent No.: US 9,508,049 B2
(45) Date of Patent: Nov. 29, 2016

(54) UPDATE-TRIGGERED DOCUMENT-DEFINED WORKFLOW

(75) Inventors: John William Lumley, Bristol (GB); Steven Battle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1806 days.

(21) Appl. No.: 12/550,383

(22) Filed: Aug. 30, 2009

(65) Prior Publication Data

US 2011/0055180 A1  Mar. 3, 2011

(51) Int. Cl.
*G06F 17/30* (2006.01)
*G06Q 10/06* (2012.01)

(52) U.S. Cl.
CPC .............. *G06Q 10/06316* (2013.01)

(58) Field of Classification Search
CPC .............................. G06Q 10/06316
USPC ....................................... 707/748
See application file for complete search history.

(56) References Cited

U.S. PATENT DOCUMENTS

| | | | |
|---|---|---|---|
| 5,706,452 A | 1/1998 | Ivanov | |
| 5,878,398 A | 3/1999 | Tokuda et al. | |
| 6,038,541 A | 3/2000 | Tokuda et al. | |
| 6,170,002 B1 | 1/2001 | Ouchi | |
| 6,401,073 B1 | 6/2002 | Tokuda et al. | |
| 6,647,130 B2 | 11/2003 | Rhoads | |
| 6,860,422 B2 | 3/2005 | Hull et al. | |
| 6,892,357 B2* | 5/2005 | Stephan | 715/765 |
| 7,120,699 B2* | 10/2006 | Stork | G06Q 10/10 709/239 |
| 7,356,611 B1* | 4/2008 | Stork | G06Q 10/10 709/239 |
| 7,472,341 B2* | 12/2008 | Albornoz | G06Q 10/10 715/229 |
| 7,539,982 B2* | 5/2009 | Stuart | 717/140 |
| 2003/0055811 A1* | 3/2003 | Stork et al. | 707/1 |
| 2003/0093755 A1* | 5/2003 | O'Carroll | G06F 17/218 715/205 |
| 2005/0086588 A1 | 4/2005 | McGregor et al. | |
| 2007/0250335 A1 | 10/2007 | Hodges et al. | |
| 2009/0254610 A1* | 10/2009 | Arthursson | 709/203 |

\* cited by examiner

*Primary Examiner* — Sheree Brown
(74) *Attorney, Agent, or Firm* — HP Inc Patent Department

(57) ABSTRACT

A computer-implemented update-triggered document-defined workflow method provides for triggering an update to an original source document to yield an updated document. In response, a document handler executes the document-defined workflow method so as to create, delete, or modify a target document or so as to create a workflow description calling for creating, deleting, or modifying a target document.

14 Claims, 1 Drawing Sheet

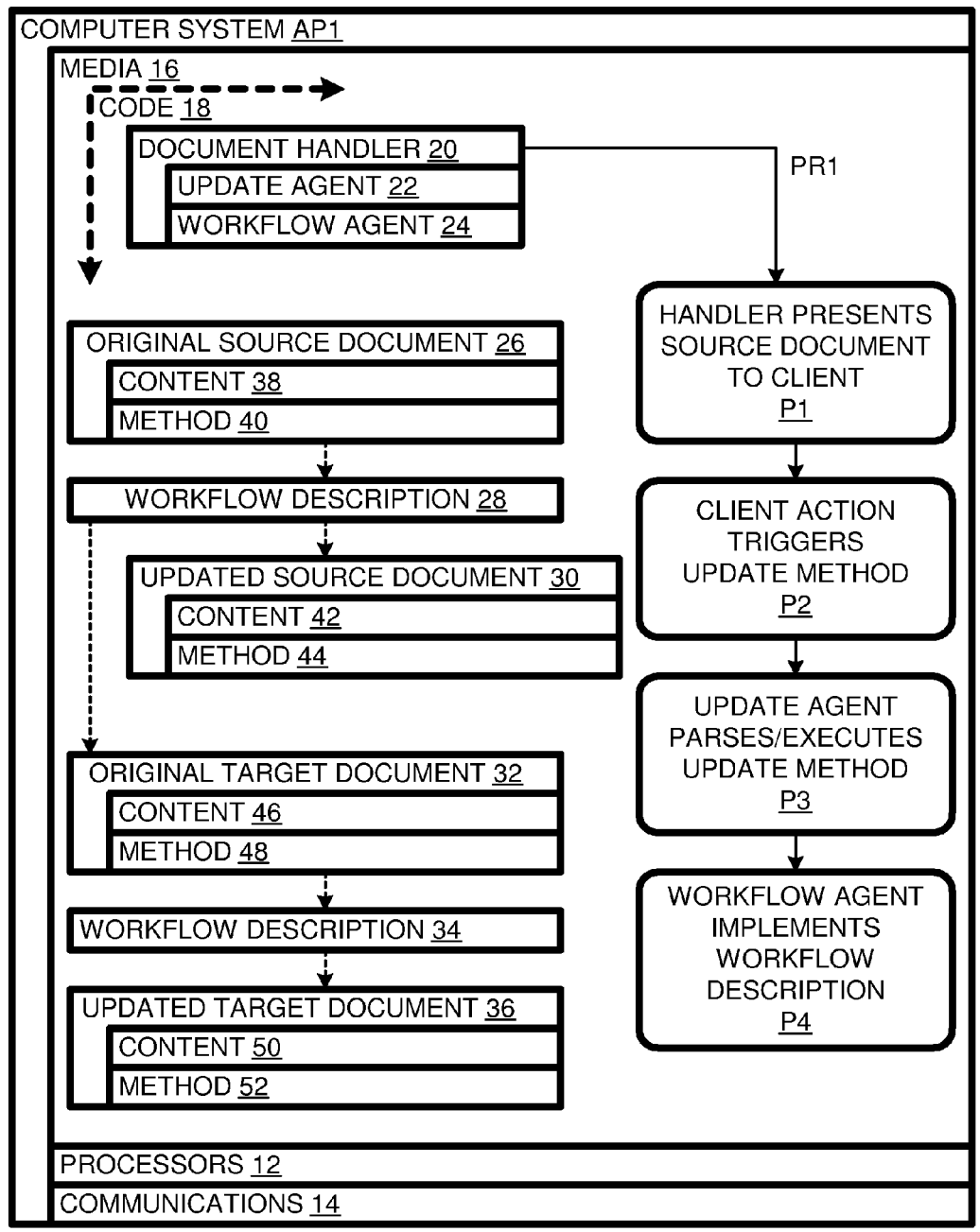

UPDATE-TRIGGERED DOCUMENT-DEFINED WORKFLOW

BACKGROUND

Herein, related art is described for expository purposes. Related art labeled "prior art", if any, is admitted prior art; related art not labeled "prior art" is not admitted prior art.

In some document-processing applications, updating one document can call for the creation, deletion, or modification of other documents. For example, an update of a document may have to be represented in a log document or in a master document of which the updated document is a part. Where XML or other electronic documents are involved, a program can be developed to automate the creation, deletion, or modifications called for by a document update.

BRIEF DESCRIPTION OF THE DRAWING

FIG. 1 is a combined schematic diagram and flow chart of a document processing system and method.

DETAILED DESCRIPTION

Document workflows are defined by the documents themselves, rather than by a separate program such as a workflow manager. A workflow agent is used to interpret and implement the document-defined workflows when triggered by a document update. For example, the original and updated documents can be XML documents that specify document procedures using XSLT code. The workflow agent can interpret and implement the XSLT code.

The entity that interprets and implements document-defined workflow descriptions is referred to as a "workflow agent" as it implements document procedures defined by a document; this is opposed to a "workflow manager" that would define its own activities vis-à-vis documents. While a workflow agent may define some of its own methods, changes to workflow can be defined solely in documents and not split between the documents and the workflow agent or manager. Also, the workflow agent can be used in different applications to implement different document-defined workflows.

A computer system AP1 includes processors 12 for executing and manipulating code, communications devices 14 (including input-output devices and networking devices), and computer-readable storage media 16 (including solid-state and disk-based media). Media 16 is encoded with code 18 defining a document handler 20, which includes an update agent 22 and a workflow agent 24. In addition, code 18 defines, at various times, an original source document 26, a source workflow description 28, an updated source document 30, an original target document 32, a target workflow description 34, and an updated target document 36.

Herein, a "document" is a computer file that includes content, e.g., audio/visual content) suitable for presentation to a user. The content can include text, photographic and video images and other static and animated graphical content. In the illustrated embodiment, the files are XML files; in alternative embodiments other file types associated with programs designed to manipulate the document files are used. Each document includes content to be displayed when the document is presented to a user. In addition, each document may also include one or more methods, execution of which can be triggered in a variety of ways.

Accordingly, original source document 26 includes content 38 and method 40; updated source document 30 includes content 42 and method 44, original target document 32 can include content 46 and method 48, and updated target document 36 can include content 50 and method 52. "Updated" herein implies a change in at least one of a document method and document content. "A method" can be a composite method and include methods to be executed in response to submission of an update action and methods to be executed in response to a workflow action.

Contents 38, 42, 46, and 50 can be in XML format and include text, images, and other objects to be presented to a user. Methods 40, 44, 48, and 52 can be in XSLT format and include definitions and programmatic content. Each of these methods can be a composite of plural methods, e.g., involving different responses to different input conditions. Thus, workflow components and generators of workflow components are located, for the most part, in the documents themselves. In other embodiments, other schemes can be used, but XML statements and XSLT transforms have coherent and controllable effects, and can process the programs themselves.

Document 20 implements a workflow process PR1, flow charted on the right side of FIG. 1. At process segment P1, original source document 26 is presented to a client or user. For example, a form can be presented to a user through the user's browser running on a client computer. As shown by example further below, an update can be triggered by a workflow action, in which case, a user action may not be involved and process segment P1 can be omitted.

At process segment P2, the user or workflow action triggers an update of original source document 26. What triggers an update is defined by method 40. In one instance, the user can fill out a form and press a "submit" button. In another instance, a series of updates is triggered as the user makes various edits to a document. In other instance, a workflow agent triggers the update.

The triggering action is parsed by update agent 22 at process segment P3; in this case, update agent 22 reads and interprets method 40, or at least the part of method 40 called for in response to the triggering action. "Parse" herein is used to capture two features of system AP1: first, document handler 20 interprets document methods instead of simply executing them; second, document handler 20 can decide to discard or modify a document method. Thus, document handler can implement policies for handling badly formed or badly behaved document methods. For example, a document handler can issue a warning when a document method "does not compute" or fails authentication.

Document methods can be designed to accomplish a variety of tasks, including rejecting a proposed input, updating content, updating methods, generating, deleting, and updating new documents, sending emails to users or administrators, etc. One of the tasks that can be called for by a document method is the generation of a workflow description. For example, when update agent 22 executes method M40 in response to the action at process segment P1 or P2, document method 40 can generate a workflow description 28. In the present case, the arguments to method 40 include contents 38 and the triggering actions (e.g., contents added by a user in completing a form).

Workflow descriptions can serve a variety of document workflow tasks. For example, a workflow description can call for updating the source document. However, a workflow description can also call for creating, deleting, and modifying other "target" documents. In the illustrated case, workflow description 28: 1) calls for modifying original source document 26 to yield updated source document 30; and 2) calls for modifying original target document 32.

Update agent 22 passes the workflow description to workflow agent 24, which parses and implements the described workflow at process segment P4. As with the update agent in process segment P3, workflow agent 24 can embody programming of its own that may result in the workflow being discarded without yielding any further results, being modified prior to execution, and/or being scheduled for later execution. However, in the normal course of operation, workflow agent 24 will execute the workflow described by workflow description 28 as generated. This can mean creating, deleting, or modifying an existing document.

In the illustrated instance, workflow agent 24 executes workflow description 28 as written, which results in an update action being applied to original target document 32. Update agent 22 responds by executing an update sub-method of document method 48, resulting in a target workflow description 34. Workflow agent 24 then executes this workflow description, which calls for updating original target document 32 so as to yield updated target document 36, which may differ from original target document 32 in content or method or both. In an alternative embodiment, the workflow agent simply executes requests resulting from document methods. In other words, process segment P3 impacts the document directly without an intervening processing segment P4.

In one instance of process PR1, document handler 20 responds to a request by presenting, at process segment P1, a blank club membership form to a user via the user's browser. The user completes and submits the membership form at process segment P2, yielding a completed form. Update agent 22 then parses the document form to identify a method specified therein. Update agent 20 then implements the method to yield a workflow description that calls for a membership card to be generated and emailed to the user and also for a membership list to be updated.

In system AP1, document workflow can be modified without modifying document handler 20. For example, instead of automatically sending a membership card to every user that completes a membership form, it might be desirable to send a membership card to only those users that check a box on the membership form requesting a membership card. This change in workflow can be accomplished by modifying the method in the form document without changing document handler 20. For example, the following code section can be added to method M40:

if(card-required and email-address)
        create membership-card
        update membership-card—name=JohnDoe, member-no=123456
        email membership-card—to=johndoe's email address While, in the description above, reference is made to a single original source document, system AP1 provides for templates that can modify the content or programmatic aspects of a top-level source document. Thus, process PR1 can deal with source document hierarchies as well as single documents. As mentioned above, document standards other than XML and XSLT can be used. These and other variations upon and modifications to the illustrated system and method are within the scope of the claimed subject matter.

What is claimed is:

1. A computer-implemented update-triggered document-defined workflow process comprising:

interacting with an original version of a source document so as to trigger a document method included in said original source document to yield an updated version of said source document; and in response to said triggering, executing said method so as to generate a workflow description that calls for creating, deleting, or modifying or so as to generate a workflow that creates, deletes, or modifies a target document other than said source document.

2. A document-workflow process as recited in claim 1 wherein said source document is an XML document.

3. A document workflow process as recited in claim 2 wherein said document method is an XSLT method.

4. A document workflow process as recited in claim 1 wherein said original version of said source document is an uncompleted form and said updated version of said source document is a completed form.

5. A document workflow process as recited in claim 1 wherein said triggering is performed by a user and said target document is provided to said user in response to execution of said workflow description.

6. A system comprising non-transitory computer-readable storage media encoded with code that, when executed by a processor, defines an original version of a source document and a document handler for detecting a triggering action with respect to said original version of said source document, said document handler, when triggered by said triggering action, executing a document method included in said original version of said source document so as to update said source document and to create, delete, or modify or so as to generate a workflow description calling for creating, deleting, or modifying a target document other than said original version of said document.

7. A system as recited in claim 6 further comprising said processor.

8. A system as recited in claim 6 wherein said original version of said source document is an XML document.

9. A system as recited in claim 7 wherein said document method is defined using XSLT.

10. A system as recited in claim 6 wherein said original version of said document is an uncompleted form and the execution of said document method updates said original version of source document to yield an updated version of said source document, said updated version of said source document being a completed form.

11. A computer system comprising a processor and media encoded with code defining:

an update agent for updating a source document including a document method and executing said document method so as to generate a workflow description, wherein said workflow description, when executed, deletes, creates, or modifies a target document other than said source document; and a workflow agent for executing said workflow description.

12. A computer system as recited in claim 11 wherein said original source document includes content that serves as an argument to said document method.

13. A computer system as recited in claim 11 wherein said original document is an XML document.

14. A computer system as recited in claim 13 wherein said document method is defined in XSLT.

* * * * *